United States Patent [19]

Stacy

[11] 4,357,932
[45] Nov. 9, 1982

[54] SELF PUMPED SOLAR ENERGY COLLECTION SYSTEM

[75] Inventor: W. Dodd Stacy, Sharon, Vt.

[73] Assignee: Creare Incorporated, Hanover, N.H.

[21] Appl. No.: 154,535

[22] Filed: May 29, 1980

[51] Int. Cl.³ ............................................. F24J 3/02
[52] U.S. Cl. .................................. 126/433; 126/435; 126/437; 165/104.22
[58] Field of Search ............. 126/433, 434, 432, 437, 126/435; 165/105, 104.22, 104.27

[56] References Cited

U.S. PATENT DOCUMENTS

| | | | |
|---|---|---|---|
| 4,050,509 | 9/1977 | Bienert et al. | 165/105 |
| 4,052,976 | 10/1977 | Hinterberger | 126/433 |
| 4,089,366 | 5/1978 | O'Hanlon | 165/105 |
| 4,171,721 | 10/1979 | Movick | 165/105 |
| 4,206,745 | 6/1980 | Gilgen | 126/433 |

Primary Examiner—James C. Yeung
Attorney, Agent, or Firm—Cesari and McKenna

[57] ABSTRACT

The present invention relates to a cyclic method and single pipe system for collecting and transferring heat energy from a periodic heat source to a thermal storage reservoir and preventing the back flow of such heat energy. The system is responsive to the temperature of the thermal storage reservoir and the availability of the heat source without reliance upon other external energy inputs or controls such as valves, pumps, floats, sensors, or electronic circuitry. During the heat collection stroke of the cycle an evaporator containing a volatile liquid generates a flow of vapor to a remote heat exchanger where the vapor gives up its latent heat of vaporization to the thermal storage reservoir, thereby condensing. Condensate flows from the heat exchanger to an insulated pressure sustaining sump that efficiently accepts pulsatile fluid delivery. During periods of heat source unavailability, heat loss from the evaporator to its surroundings condenses the vapor therein, reducing evaporator pressure and allowing vapor pressure in the sump to return the sump liquid through the heat exchanger to the evaporator, this return stroke completing the cycle. The sealed single pipe system employs no moving parts and is applicable to any periodic or intermittent source of heat such as solar insolation.

14 Claims, 3 Drawing Figures

SELF PUMPED SOLAR ENERGY COLLECTION SYSTEM

BACKGROUND OF THE INVENTION

A. Field of the Invention

The invention relates to a self-pumped heat energy collection and transfer system and, in particular, to a single pipe, two stroke system suited to solar energy applications which may require remote collection of energy at an elevation higher than that of the energy use or storage means.

B. Prior Art

The use of solar energy has frequently been proposed for both heating and for domestic hot water (i.e., water for cooking, washing, and the like). In either application, a storage tank of sufficient capacity to supply the heated water in the quantities required is maintained at the desired temperature by energy supplied to it from a solar collector. While the collector may be positioned at a high elevation, e.g. the roof of a house or other building, in order to obtain maximum exposure to solar radiation, the storage tank, because of its substantial weight when filled, is preferably located at some other point, such as in the basement of the home.

Solar energy systems previously proposed for delivering heat to a lower elevation thermal storage reservoir include both active and passive approaches. Active systems generally employ a circulating pump, sensors, a control package, and a complete piping loop in addition to the solar collector panels and means for storing the thermal energy collected. For example, in the low reservoir version of the solar heating device of U.S. Pat. No. 3,390,672, issued July 2, 1968 to C. D. Snelling, a pump, actuating device or switch, and liquid return pipe are required, in addition to electric power to drive the pump.

Passive down-pumping solar heating concepts generally employ multiple conduits, floats, valves, and frequently sensors, control circuitry, and valve actuators. Thus, the U.S. Pat. No. 4,061,131 issued Dec. 6, 1977 to H. R. Bohanon, for example, a thermal storage reservoir is positioned below the heat collector and flow of a circulating fluid is regulated by a float valve in a liquid trap, a check valve, and further, by a dual level control system in a transfer tank employing various floats, a drain valve, and requisite mechanical linkage.

Somewhat simpler passive designs are in use in which the thermal storage reservoir is either directly exposed to the sun—the "breadbox" type—or located above the heat collectors and charged by a gravity "thermosyphon" loop of either single or two phase fluid. These latter designs have demonstrated impressive long-term effectiveness due in large part to functional reliability. Architectural restrictions on the placement of the components and the inescapable need to support the weight of the thermal storage reservoir above the heat collectors, however, limit their common application to domestic hot water systems, with their relatively compact and light reservoirs. Heated water must still be drawn down a relatively long pipe to the use point, with attendant heat loss and lag time.

Active low reservoir systems have the potential for optimum efficiency and allow considerable architectural freedom, but high capital cost, significant operating cost, and faults in design, materials, installation, and control are common. In short, reliability is frequently lacking.

None of the passive low reservoir schemes referred to above have yet been convincingly demonstrated in field use, but their generic dependence on moving mechanisms, tightly sealing but frequently operated valves, and multiple pipe fluid circuits suggests cost and reliability disadvantages comparable to those of active systems.

The utilization of a heat pipe for passively pumping heat energy is discussed in U.S. Pat. No. 4,050,509 issued Sept. 27, 1977 to Bienert et al, and its possible applicability to residential heating systems is considered in U.S. Department of Energy Report COO-4484-02. Among other disadvantages, the device described there relies upon the inclusion of a noncondensible gas to accomplish the return pumping stroke, forcing the heat collector to operate at a correspondingly higher temperature than that of the thermal storage reservoir and thereby substantially reducing collection efficiency.

SUMMARY OF THE INVENTION

In view of the foregoing, it is a principal object of the present invention to provide a solar energy collection and transfer method and system that is self-pumped, simple, highly reliable and responsive to storage temperature and heat source availability.

It is a further object of the present invention to provide a solar energy collection and transfer system that allows maximum design freedom regarding the components of the system, particularly placement of the thermal storage reservoir relative to the heat collectors.

It is another object of the present invention to provide a solar energy collection and transfer system that eliminates separate energy input into the system for circulating the working fluid and that additionally eliminates circulation controls such as pumps, valves, floats and sensors.

It is yet another object of the present invention to provide a freeze proof system for daily heat collection in variable climates at high thermal efficiency and reduced cost.

In contrast to many prior systems, the present invention employs no moving parts other than its working fluid, is passive in operation, and allows arbitrary relative placement of its heat collector and thermal storage reservoir.

The present invention comprises a system in which the heat collector operates at a temperature only slightly higher than that of the thermal storage reservoir and, additionally, tracks rapid and frequent variations in reservoir temperature due to demand loads. Further, it applies the concept of a heat pipe to a case where the heat input (e.g., solar radiation) is periodic or intermittent.

The invention diverges from the classical heat pipe in, among other aspects, the manner of returning liquid to the collector to complete the thermodynamic cycle. Heat pipes cycle continuously, with condensate return to the collector via either gravity or capillary action. The former requires that the collector be situated below the condensor; the latter can elevate liquid to only an extremely small extent. The present invention does not cycle continuously, but instead employs a cycle comprised of two discrete, discontinuous "strokes", a delivery or "day" stroke to transfer heat by means of vaporized working fluid in the daytime and a return or "night" stroke to return liquid phase working fluid at night.

Specifically, heat absorbed by the collector during the daytime vaporizes a volatile working fluid supplied to the collector from an elevated day tank by means of an insulated downcomer, the fluid storage capacity of the day tank being adequate for at least a full day's operation. The vaporization effectively maintains the surface temperature of the collector substantially near the boiling temperature of the working fluid. The vapor thus formed flows through a conduit free from additional energy input and enters a heat exchanger or condenser in which the vapor gives up heat to a thermal storage reservoir in contact with the heat exchanger and thus condenses to the liquid phase. Small temperature and pressure gradients between the collector and the heat exchanger and its associated thermal storage reservoir drive the flow of vapor phase working fluid during the delivery stroke. Liquid condensed in the heat exchanger drains through a further conduit to a sealed sump where it is accumulated under its own vapor pressure.

During the return stroke, nighttime heat loss condenses vapor in the upper portions of the collector and its working fluid reservoir, thereby reducing the pressure in that part of the system. The sustained vapor pressure in the sump then pumps the liquid from the sump through the heat exchanger and back to the collector and day tank against the steadily diminishing pressure of the latter. The return stroke is completed when the collector and day tank are liquid filled, there being no more vapor to condense in the collector or day tank to continue the process further. The liquid-filled collector is then ready for the next cycle.

DETAILED DESCRIPTION OF THE INVENTION

Although the invention may be applicable to other than solar energy collection, the following description discloses the invention as applied to collecting and transferring solar energy.

Figure 1:
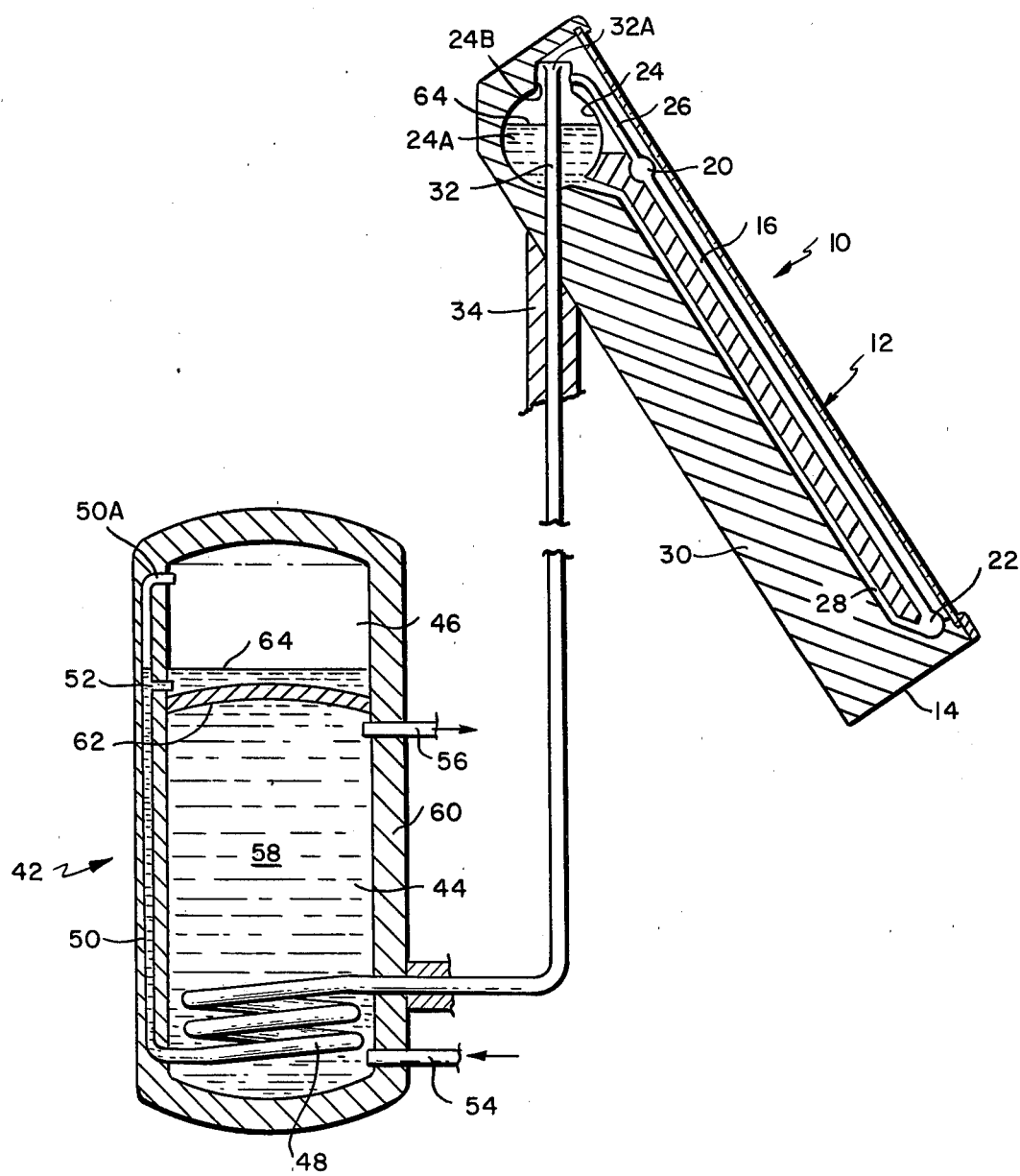
FIG. 1 is a diagrammatic view of one embodiment of my invention that is especially suited to working fluids having a high vapor pressure vs. temperature gradient.
Figure 2:
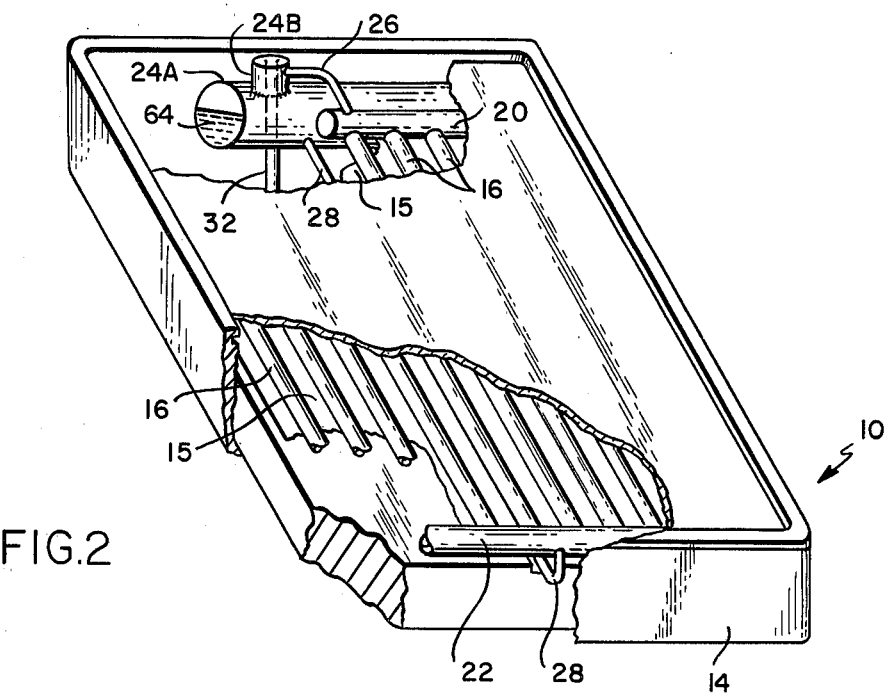
FIG. 2 is a frontal view of the collector of FIG. 1, with portions broken away for clarity.

In FIGS. 1 and 2, an energy collection and transfer system in accordance with the present invention includes a heat collector 10 (shown in side cross-sectional view) having a transparent cover 12 supported by a weather-proof enclosure 14. Solar radiation transmitted through the cover 12 impinges on a flat collector plate 15 of metal or other heat-absorbing material (FIG. 2) and heat-collecting tubes 16 in close thermal contact with the plate 15; for reasons to be described, at least the tubes 16 are of restricted cross-section to thereby limit counter-current flow therein. The tubes terminate in headers 20, 22, and are in turn connected to a reservoir 24 by tubes 26, 28, respectively.

The reservoir 24 comprises an extended storage chamber of sufficient volume to hold, together with the collector tubes and headers, a supply of working fluid adequate for a full cycle of operation as described more fully below. Advantageously it is formed from an elongated cylindrical chamber 24A having a smaller upper vapor chamber or bell 24B formed thereon. It is sealed fluid-tight except for its connections to the collector headers 20, 22 through the conduits 26, 28, and its penetration by a downcomer 32 whose upper end 32A terminates just below the top of the bell 24B and whose lower end connects the reservoir to a heat exchanger and sump 46. Insulation 30 surrounds the reservoir 24 and the back portion of the collector plate and tubes; similarly insulation 34 surrounds the downcomer 32.

The tank 42 comprises a thermally insulated container having a lower chamber 44 and an upper chamber 46. The downcomer 32 penetrates the lower chamber 44 and is formed into a heat exchange coil or condenser 48 within the lower portion of this chamber. It exits from this chamber and continues upwardly as a riser 50 having an end 50A which terminates in the upper portion of the chamber 46. A restricted orifice 52, positioned at the lower portion of the chamber 46, also communicates with the riser 50. For purposes of illustration, the riser 50 and its discharge end 50A may be considered as having an internal diameter of $\frac{1}{4}$ inch and the orifice 52 an internal diameter of $\frac{1}{8}$ inch. A water inlet pipe 54 and an outlet pipe 56, are connected to the lower chamber 44. The pipe 54 supplies water 58 to the chamber 44 for heating by the coil 48; the pipe 56 removes the heated water from the chamber 44 and supplies it for external use. The pipes are then connected into the domestic hot water system in a conventional manner. Insulation 60 surrounds the chambers 44, 46 and limits heat loss to the environment. A wall 62 of controlled conductivity is interposed between the chambers 44, 46. It limits short-term heat transfer (i.e., during a period of less than a few hours) from the liquid 58 in the upper portion of chamber 44 to the working fluid 64 in chamber 46 during the day or delivery stroke, but is of sufficient conductivity to allow gradual heat transfer (i.e., over the course of several hours or more) from the liquid 58 to working fluid 64 during the night or return stroke sufficient to vaporize a portion of the working fluid at night for the return stroke when conditions warrant.

The system comprising the collecting tubes 16, the reservoir 24, the downcomer 32, coil 48, riser 50, and chamber 46, form a hermetically sealed system containing the liquid and vapor phases of a working fluid 64 which cycles back and forth diurnally between the chamber 46 and the collector 10 in a manner that will now be described in detail.

The collector 10 is positioned at a point where it will receive unobstructed exposure to incident solar radiation. For example, it may advantageously be placed on the roof of a home. Similarly, the unit 42 is placed below the level of the collector 10, for example, in the basement. The system operates on a cycle comprising a "day" stroke in which vapor phase working fluid, and thus solar energy, is transferred from the collector 10 to the unit 42, and a "night" return stroke in which liquid phase working fluid is returned to the collector 10 to complete the cycle.

At the start of a given cycle, that is, at the beginning of a day, the entire liquid phase working fluid inventory 64 of the system is stored substantially in the reservoir 24 and the collecting tubes 16 and their interconnecting headers 20, 22 and conduits 26, 28; only a small amount is stored in the downcomer 32, coil 48, and riser 50. As solar radiation impinges on the collector plate 15 and tubes 16, it rapidly heats the liquid in the tubes 16, bringing this liquid to a boil. The vaporized fluid caused by this boiling travels up the tubes 16 to the header 20 and thence through the connecting tube 26 to the reservoir 24. In so doing, it may carry with it liquid phase working fluid from the tubes 16 which is separated from the vapor stream in the bell 24B and collects in the bottom of the reservoir 24. Liquid from the reservoir returns down the tube 28 to replenish the fluid supply in tubes 16.

The vapor expelled from the tubes 16 collects above the liquid pool in the reservoir 24 and thence flows downwardly through the downcomer 32 and into the heat transfer coil 48. In passing through this coil, the vapor condenses, giving up its latent heat to the liquid 58 surrounding the heat exchanger. The heat liquid (e.g. water) in chamber 44 may remain for further heating or be removed from the chamber by means of pipe 56, and further liquid may be supplied via pipe 54 for subsequent heating in the manner described.

As noted previously, the tubes 16 are of relatively small internal diameter (bore). As they receive heat, the fluid within them is brought to the local boiling temperature. When the collector, and thus the tubes, are positioned at an angle to the horizontal, as shown in FIG. 1, the localized boiling temperature increases because of the increased "head" pressure as one moves from the upper end of the tubes adjacent the reservoir 24, to the lower end thereof remote from the reservoir. With tubes of a diameter sufficiently large as to present insignificant fluid resistance, boiling would simply occur primarily at the upper section of the tubes, and the varporized fluid would be replenished at a corresponding rate from the header 22. However, because of the reduced size of the bore of tubes 16, the escape of vaporized fluid at the upper end of the tube is sufficiently retarded that significant boiling can occur at the lower end of the tubes. The result is a periodic "percolation" or "geysering" in the tubes which propagates pressure surges through the reservoir 24, downcomer 32, and thence to the heat exchanger 48. When the rate of vapor delivery to the heat exchanger 48 momentarily exceeds the condensing rate (as when the collector 10 delivers a surge of vapor), uncondensed excess vapor, along with condensed liquid, exits the heat exchanger and flows with substantial velocity through the riser conduit 50 to the sump 46.

The bulk of the surge of liquid and vapor flows directly to the sump vapor space via the discharge end 50A of riser 50. The excess vapor thus accumulates momentarily in the vapor space above the liquid 64 without bubbling through it and thus without depositing its energy disadvantageously in the liquid. When the collector surge dies down and the heat exchanger catches up with the system vapor inventory, the excess vapor in the sump vapor space backflows down through the riser 50 to the heat exchanger 48; at the same time, a small amount of sump liquid flows from chamber 46 through the restricted orifice 52 to riser 50 and returns to the condenser coil 48. The sump thus serves both as a long term (i.e., the duration of a "day" stroke) accumulator for condensed working fluid, as well as a short term accumulator for surges in the vapor output of the collector 10. Because of the oscillating vapor flow superimposed upon the net flow of the "day" stroke, the thermal communication between the sump vapor space and heat exchanger is excellent, encouraging thermodynamic equilibrium throughout the system and guaranteeing the dominance of the heat exchanger in setting system pressure and temperature.

Because sump heat gain from the reservoir top in the configuration of FIG. 1 is properly restricted, for example by appropriate control insulation 62, the cooling effect of incoming condensate from the heat exchanger dominates the sump heat balance during the period of heat collection, and the sump tracks just a few degrees above reservoir bottom temperture all day. It is not until useful collection trails off to some arbitrarily low rate near sunset that heat gain from the reservoir top begins to dominate in the control of sump temperature and pressure, as the system begins to ready itself for the return stroke. As the return pumping occurs, the hot sump liquid passes first through the heat exchanger, returning any "borrowed" heat to the cold water portions of the reservoir before traveling up the downcomer to the day tank and collector.

For the return stroke to occur, the fluid in sump 46 must achieve a temperature adequately higher than the minimum nighttime ambient temperature (since the collector is at approximately this temperature), depending upon the working fluid and overall elevational difference. Summer operation of a domestic hot water system in a hot, humid climate is probably the most adverse case. High nighttime ambient temperature and sky haze may prevent cooling of the collector below day's end sump temperature, especially if hot water demand were high during the day. To ensure that the liquid in the sump will achieve a temperature adequately above the minimum nighttime ambient temperature to execute the return stroke under such adverse conditions, thermal communication is provided between the sump 46 and the warmer top portion of the storage reservoir 44 by means of the control insulation 62. Given enough time, such as between sunset and 2:00 AM, the sump approaches the temperature of the hottest portion of the reservoir (140 to 160 degrees Farenheit), ensuring successful pumping. The upper portion of reservoir 44 may be equipped with a conventional backup heating element such as electric coil or other element (not shown) for periods of inclement weather.

In transporting heat from collector 10 to the storage reservoir 44, the system functions as a heat pipe. Liquid phase working fluid boils in the collector upon absorbing solar energy input and transfers this heat to the storage reservoir via heat exchanger 48 where it condenses back to the liquid phase. Because the evaporator is producing vapor and the heat exchanger is "consuming" it, a pressure gradient is maintained which drives the flow of vapor continuously from the collector to the heat exchanger during the day stroke. The collector temperature is therefore determined by the temperature in the storage reservoir, and tracks this temperature within a few degrees Farenheit. This results in operation of the collector at the lowest feasible collection temperature, and thus greatly enhances collector and system efficiency and reliability.

The detailed characteristics of a particular embodiment of the invention may vary with climatic conditions, design temperatures, and size and weight restraints under which the system might be required to operate. FIG. 1, for example, shows a mode of the invention best suited for cyclic operation under conditions where the nighttime ambient temperature may be only minimally below the temperature of the sump fluid at the end of the heat absorbing period of a day. Certain working fluids, namely, those with a substantially high vapor pressure/temperature ratio, perform well under such conditions, since they require only a small difference between the nighttime ambient temperature and the sump temperature at the end of the day to power the fluid return stroke.

Table 1 displays a partial listing of typical working fluids suitable for use in the present invention, along with their thermodynamically important characteristics. For a given minimum nighttime ambient temperature and elevation of heat collectors above the thermal storage reservoir, each fluid will execute the fluid return stroke at a sump temperature determined by its liquid phase density $\rho_f$, and the slope of its vapor pressure curve. The last column in Table 1 lists this fluid return temperature, $T_{fr}$, based upon a 60 degree nighttime ambient and 30 foot elevation of the heat collectors above the thermal storage reservoir. The capacity of the day tank and sump are determined by the latent heat of vaporization, $h_{fg}$, and liquid phase density of the working fluid. The column headed $V_D$ for example displays the requisite day tank volume per square foot of solar collector for each fluid listed.

TABLE 1

| | Working Fluid Characteristics | | | |
|---|---|---|---|---|
| Fluid Name | $\rho_f \frac{lbm}{ft^3}$ | $h_{fg} \frac{BTU}{lbm}$ | $V_D \frac{gal}{ft^2}$ | $T_{fr}(°F.)$ |
| Formaldehyde | 45 | 306 | .453 | 68 |
| Methylamine | 41 | 351 | .434 | 70 |
| Dimethylamine | 40 | 250 | .624 | 76 |
| Acetaldehyde | 48 | 252 | .516 | 89 |
| Isopropyl Amine | 43 | 225 | .645 | 92 |
| Acetone | 50 | 234 | .533 | 120 |
| Methanol | 50 | 504 | .248 | 139 |

As an example of use of the system for domestic hot water applications, typical household usage is of the order of 20 gallons per day per person. Using methanol as the working fluid, approximately two pounds of methanol absorbing radiation over a collector surface of one square foot will suffice to produce one gallon of suitably hot domestic water per day and thus a collector of twenty square feet, charged with forty pounds of methanol, will produce sufficient domestic hot water during the day for a single person's needs.

Because economy and weight considerations suggest use of a compact day tank and storage sump, a working fluid with substantially high latent heat of vaporization should be used. However, if such a working fluid does not also exhibit a high P(vapor)/T, fluid pressure rise in the heat exchanger and collector above that in the sump in order to overcome the static head of liquid in the riser 50 will produce a substantial temperature rise and performance penalty in collector operation. Accordingly, when conditions warrant the use of fluids of low P(vapor)/T or when remote sump placement is desirable, an embodiment such as illustrated in FIG. 3 may be employed.

Figure 3:
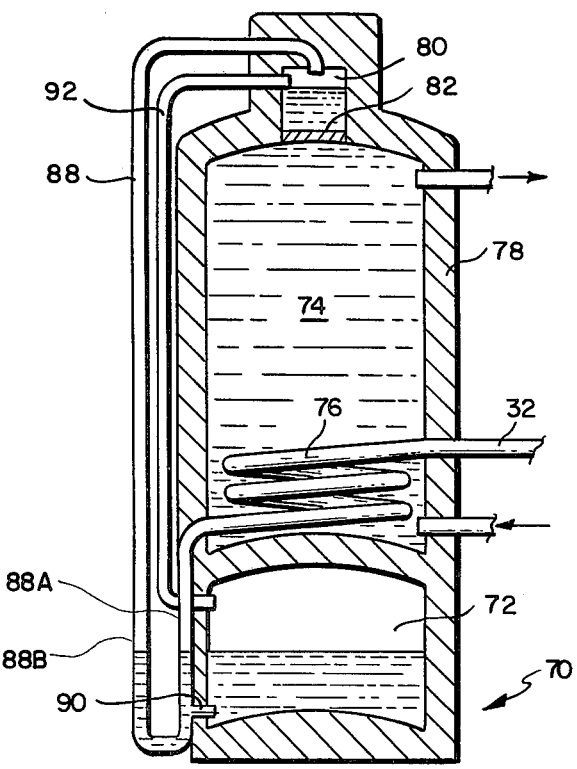
FIG. 3 is a diagrammatic view of an alternative embodiment of my invention that is especially suited to use of working fluids having a moderate vapor pressure vs. temperature gradient and/or to the use of a remote working fluid sump.

In FIG. 3, a combined water storage and sump tank 70 includes a sump chamber 72 positioned below, and thermally insulated from, a water storage chamber 74 by means of insulation 78 which extends not only between these chambers but substantially completely around them to minimize heat loss to the surrounding environment. A further chamber 80 is positioned above the chamber 74 and is placed in controlled thermal contact with it by means of an area of limited insulation 82 which allows the attainment of long-term (i.e. several hours or more) thermal equilibrium between the liquids in the chamber 74 and 80, respectively, while limiting the attainment of short term (less than a few hours) equilibrium between these chambers. The downcomer pipe 32 (see FIG. 1) includes a section formed as a heat transfer coil 76 in chamber 74, as was previously the case, and continues in a conduit 88 which extends at first downwardly, via leg 88A, past the sump chamber 72 and then upwardly to the chamber 80. The bottom leg of this conduit is below the bottom of chamber 72 to allow complete drainage of the latter as subsequently described below. An orifice 90 of restricted dimensions relative to the bore of conduit 88 interconnects the bottom of the chamber 72 and conduit 88. The conduit 88 enters the chamber 80 at the upper portion of the latter; the liquid phase of the working fluid in conduit 88 is deposited in chamber 80 during surges in collector output as previously described, and accumulates in this chamber until it reaches the height of an outlet tube 92 at which time it passes down through this tube into the sump chamber 72. The vapor phase of working fluid in the tube 88 for the most part passes directly through the chamber 80, through the pipe 92 and thence into the vapor space above the liquid in the chamber 72. Operation of the system of FIG. 3 is similar to that of FIG. 1, with the exception that during delivery surges the working fluid (both liquid and vapor phase) passes first through the chamber 80 prior to its ultimate return to the sump 72.

Specifically, after heat collection in the collector 10 trails off after sunset, the pressure in sump 80 rises due to heat transfer through control insulation 82 from the liquid at the top of chamber 74. As this occurs, the pressure in the collector 10 progressively diminishes, while that in the sump 80 progressively increases, until the transfer flow (from the collector to sump) ultimately stops and then reverses; this occurs when the vapor pressure in sump 80 exceeds the back pressure of collector 10 plus the pressure resulting from the difference in hydrostatic "heads" between the liquid level in the outer leg 88B of conduit 88 and that in the inner leg 88A of the conduit and its extension in coil 76 and downcomer 32. Similarly, the accumulated liquid in sump chamber 72 drains from this chamber into conduit 88 through orifice 90 when the vapor pressure in sump 80 (and thus in sump 72 because of the interconnection of these via conduit 92) exceeds the back pressure of collector 10 plus the difference in hydrostatic "head" between the liquid level in the inner leg 88A of conduit 88 and its extension in coil 76 and downcomer 32 and that in the sump chamber 72.

Because saturation conditions exist in both the collector 10 and the heat exchanger 76 and pressures in those two components differ only by the amount needed to drive the vapor flow, temperature in the collector is only minimally higher than that in the heat exchanger. The collector temperature therefore will "track" the temperature in the thermal storage reservoir 74. Thus, the system is thermally self-regulated. It "switches on" whenever the solar input is adequate to heat the evaporator up to storage reservoir temperature, and drives the working fluid in direct proportion to energy input. Moreover, the intrinsic operating efficiency of the collector is enhanced by maintaining the evaporator surface near the lowest useful temperature, as this minimizes heat loss to the surroundings.

CONCLUSION

From the foregoing, it will be seen that I have provided an improved heating system comprising a passive, two-stroke system utilizing a heat-pipe transfer principle, but providing positive pumping for the return stroke by means of a sump chamber separate from the condenser. The system of the present invention allows the energy collection portion of the system to be separated by a substantial vertical distance from the energy storage portion of the system, so that only a relatively small, lightweight structure need be positioned at the top of the house or other building in which the heating system is located. The system utilizes a single, active, working fluid, and is such that the collector temperature tracks that of the heat exchanger to within a few degrees, thus resulting in a highly efficient heat collection and transfer. The collector is provided with a number of parallel-connected tubes of limited bore to ensure a geysering action during the collection stroke for transferring the condensed vapor of the working fluid to storage sumps for accumulation in preparation for the return stroke. The geysering also ensures good thermal communication between the condenser and the sump, so that the temperature of the latter tracks that of the former to within a few degrees also.

What is claimed as new and desired to be secured by Letters Patent of the United States is:

1. A passive, two stroke heating system, comprising a reservoir for storing a working fluid primarily in the liquid state, a vaporizer positioned gravitationally below said reservoir and connected to receive liquid working fluid from said reservoir and to vaporize said fluid on application of heat energy thereto, a vessel for containing a mass of liquid to be heated, a condenser within said vessel for heating said liquid mass by condensation of working fluid vapor therein, a conduit in unrestricted fluid communication with said condenser and carrying working fluid thereto from said vaporizer during a first stroke occurring when external energy is being applied to said vaporizer at a rate sufficient to vaporize fluid therein, a sump positioned for no more than limited thermal contact with said liquid mass and connected to exchange working fluid with said condenser; said vaporizer, said reservoir, said conduit, said condenser, and said sump being hermetically sealed and in unrestricted fluid communication with each other whereby said sump accumulates substantially all the working fluid of said reservoir substantially in liquid form during said first stroke and returns said fluid in liquid form to said reservoir during a second return stroke when the vaporizer loses a sufficient amount of heat to condense the vapor therein.

2. A heating system according to claim 1 in which said sump is connected to said condenser by means of two spatially separate orifices comprising a first relatively unrestricted orifice for passage of working fluid therethrough primarily during the first stroke of said system, and a second relatively restricted orifice for return of working fluid to said condenser after accumulation in said sump primarily during the second stroke of said system.

3. A heating system according to claim 2 in which said sump is positioned immediately adjacent the warmer fluid in said vessel and in restricted heat transfer relation therewith so as to receive therefrom sufficient heat to vaporize liquid accumulated therein only over a period of time comprising a substantial portion of said first stroke.

4. A heating system according to claim 2 which includes an auxilliary chamber intermediate said relatively restricted orifice and said relatively unrestricted orifice connecting said condenser and said sump and of substantially lesser capacity than said sump, said chamber providing sufficient pumping work, when energy is applied to vaporize liquid therein, to return substantially all the working fluid in said sump to said reservoir.

5. A heating system according to claim 4 in which said chamber is placed in restricted thermal contact with the warmer part of said liquid mass to thereby obtain from said mass over a period of time comprising a substantial part of said return stroke sufficient heat to return substantially all the working fluid from said sump to said reservoir during said return stroke.

6. A heating system according to claim 1 in which said vaporizer incudes means forming a plurality of fluid conduits for boiling of liquid working fluid therein, said fluid conduits being of restricted cross-section to suppress free convection of the liquid therein, to thereby provide a percolating action forming periodic pressure surges travelling down said conduit to said condenser.

7. A heating system according to claim 1 in which said vaporizer includes a plurality of tubes having restricted bores for the purpose of providing a geysering action to the working fluid therein, and in which said tubes are positioned for collection with one end thereof lower than the other.

8. A heating system according to claim 7 in which said sump is connected to said condenser by a second conduit including a relatively unrestricted orifice for receiving fluid into said sump during geysering action of said collector and a relatively restricted orifice for discharging fluid from said sump at a limited rate for return of said fluid to said collector and said reservoir during the second stroke of said system.

9. A heating system according to claim 8 in which said unrestricted orifice is of sufficient size as to provide relatively unimpeded thermodynamic communication between said sump and said heat exchanger whereby the temperature of said sump closely tracks the temperature of said condenser during the major portion of said first stroke.

10. A passive, two-stroke heating system, comprising a collector, including a plurality of tubes connected in parallel with each other; a first reservoir in fluid communication with said collector tubes to receive fluid therefrom and discharge it thereto; a condenser; a first conduit interconnecting said reservoir and said condenser; a second reservoir in heat-exchange relation with said condenser for receiving a secondary fluid to be heated therein; a sump separate from said condenser; a second conduit interconnecting said condenser and said sump; said collector tubes, first reservoir, condenser, sump, and first, and second conduits being hermetically sealed to each other and charged with a working fluid that alternately vaporizes and condenses during operation, the working fluid being vaporized in said collector and transported to said sump via said condenser during a first, transfer stroke when said collector is receiving energy from its environment and being returned from said sump to said reservoir and collector tubes during a second return stroke when said collector is transferring heat to its environment.

11. A heating system according to claim 7 in which said sump is positioned in limited heat-transfer relation with said second reservoir through a barrier wall of limited thermal conductivity allowing the flow of sufficient heat over a period in excess of several hours to vaporize the fluid in said sump to drive the fluid therefrom and back into said reservoir and said collector tubes during the second stroke.

12. A heating system according to claim 11 including a second sump of smaller capacity than said first sump and in fluid communication therewith, said first sump receiving working fluid from said condenser by way of said second sump.

13. A heating system acording to claim 12 which includes means forming a relatively restricted orifice interconnecting said sump and said second conduit, said orifice restricting the rapid in-flow of working fluid during operation of said system on said first stroke, and providing a discharge port for slow return of fluid from said first sump to said reservoir and said collector during operation of the system on said second stroke.

14. A heating system according to claim 13 in which said auxiliary sump is established in limited heat-exchange relationship with said second reservoir by means of a barrier wall of limited thermal conductivity providing sufficient heat from said second reservoir to vaporize the contents of said second sump and cause the return of the contents of said first sump through said condenser to said collector reservoir and tubes only over a period in excess of several hours.

* * * * *